(No Model.)
O. MILLARD.
ELECTRIC BATTERY.
No. 298,997. Patented May 20, 1884.
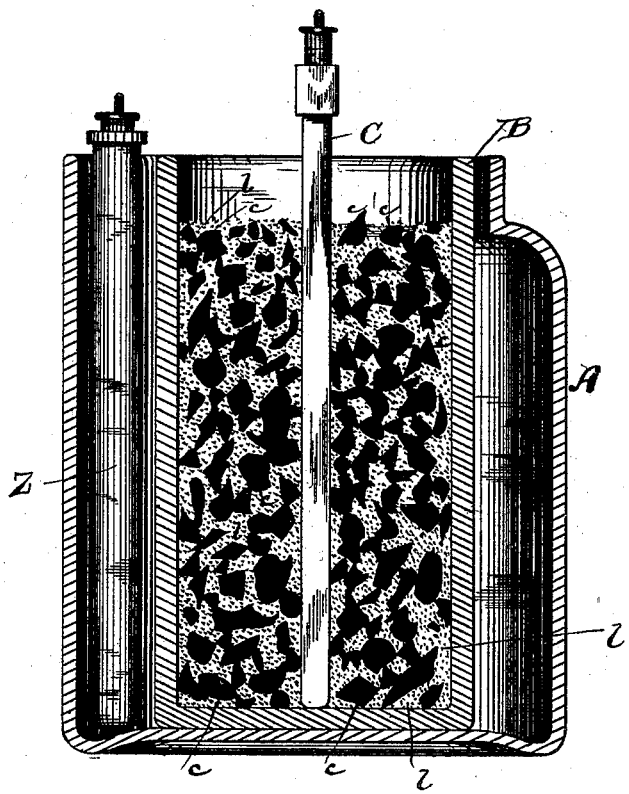
Witnesses:
C. F. Murdock
David M. Oliver
Inventor:
Orson Millard
Millard & Son
Atty.

UNITED STATES PATENT OFFICE.

ORSON MILLARD, OF FLINT, MICHIGAN, ASSIGNOR OF ONE-HALF TO CHARLES B. CRAMPTON, OF SAME PLACE.

ELECTRIC BATTERY.

SPECIFICATION forming part of Letters Patent No. 298,997, dated May 20, 1884.

Application filed October 3, 1883. (No model.)

*To all whom it may concern:*

Be it known that I, ORSON MILLARD, a citizen of the United States of America, residing at Flint, in the county of Genesee and State of Michigan, have invented certain new and useful Improvements in Electrical Batteries, of which the following is a specification, reference being had therein to the accompanying drawing.

The object of my improvement is to produce a galvanic battery of great electro-motive force and low internal resistance, and as the degree of electro-motive force depends upon the quantity of hydrogen liberated and transferred, I use as an electrolyte a substance which by decomposition furnishes a large amount of oxygen to combine with the positive or soluble electrode, and thus release hydrogen in corresponding quantities, and this electrolyte substance being also a good conductor, there is but little resistance to the passage of the current. The electrolyte substance which I use is lead chromate in powder, in connection with a solution of metallic alkali, preferably chloride of sodium, on account of its cheapness, though a solution of salts of potassium, sodium, or ammonium may be used with equally good results. In the battery I use the ordinary electrodes, placing the lead chromate in contact with the negative electrode; and with this arrangement the form of battery is immaterial—that is, it may be either single-fluid, two-fluid, porous-cup, or gravity battery. I prefer, however, to use a porous cup for holding the negative electrode and lead chromate, said cup and contents being placed in a glass or other suitable jar or vase which contains the positive electrode, and the porous cup and jar both to be filled with the metallic alkaline solution.

The accompanying drawing shows a vertical central section of a battery-cell constructed according to my invention.

In the drawing, A indicates the outer vase or jar; B, the porous cup; C, a carbon plate arranged in the porous cup as a negative electrode, in connection with lumps of gas-carbon $c$, which serve to extend the negative electrode, and among which is mixed the powder of lead chromate $l$. Z is a zinc rod forming the positive electrode, and S indicates a salt brine or solution of chloride of sodium. When the two electrodes are connected by a conductor, the electrolytic action immediately commences. The hydrogen liberated at the zinc plate combines with the oxygen which is freely given up by the lead chromate, the solution of which at the same time gives increased conductivity to the fluid. By the combination of the hydrogen released at the zinc plate with the oxygen of the lead chromate, an ample supply of water is furnished to prevent polarization, or reduction of the fluid to a condition in which it will not act efficiently on the zinc. If the porous cup were not used in a single-fluid battery, the lead chromate might be supported in contact with the negative electrode by a fibrous covering, as in some forms of secondary batteries, and in a gravity-battery the lead chromate may simply be upon the negative electrode arranged as used at the bottom of the jar.

I am aware that chromate of tin has been placed in contact with the negative electrode of a galvanic battery, and I lay no claim to a battery thus provided.

What I claim is—

1. A galvanic battery in which lead chromate is an electrolyte.

2. A galvanic battery employing lead-chromate powder as an electrolyte in connection with an alkaline solution.

3. A galvanic battery in which lead chromate is arranged in contact with the negative electrode, and the two electrodes and said lead chromate are immersed in a solution or solutions which will act on the positive electrode and release hydrogen to combine with the oxygen of the lead chromate, essentially as set forth.

4. A galvanic battery in which a mixture of lumps of carbon and lead chromate in the form of a salt is placed in contact with a carbon negative electrode, substantially as described.

In testimony whereof I affix my signature, in presence of two witnesses, this 13th day of April, 1883.

ORSON MILLARD.

Witnesses:
CHARLES F. BARBER,
CHANDLER H. ROCKWOOD.